April 1, 1969     C. W. CONROSE, SR     3,436,151

SPECTACLE MOUNTED INFINITY SIGHT FOR AN ATHLETE

Filed June 24, 1964

INVENTOR.
CHARLES W. CONROSE, SR.

BY

ATTORNEY 3,436,151
SPECTACLE MOUNTED INFINITY SIGHT
FOR AN ATHLETE
Charles W. Conrose, Sr., 534 Backus Road,
Webster, N.Y. 14580
Filed June 24, 1964, Ser. No. 377,544
Int. Cl. G01n 21/04; G02c 7/02; G01c 15/12
U.S. Cl. 356—72           2 Claims

ABSTRACT OF THE DISCLOSURE

To enable a golfer to hit a ball more accurately one of the lenses of his spectacle has a straight line scribed on its rear face and the front face of this lens is formed with a convex segmental cylindrical boss which is silvered so that it serves as a reflecting surface to reflect the line, so that when the golfer looks down at the ball he sees the image of this line. By aligning the image of the line between the ball and the hole, for instance, he then knows where to stroke the ball to putt it into the hole.

---

This invention relates to a visual aid, and more particularly, to means for enabling a golfer to putt a golf ball where he wants it. In a still more specific aspect the invention relates to a visual aid for assisting a golfer in putting.

Various visual aids have been devised heretofore for assisting the golfer in aligning his golf ball with the hole for putting the ball into the hole. A major disadvantage of such prior visual aids is that, almost without exception, these aids are mounted upon the club head, or putting blade proper, and are thus made to move with the club head during the putting stroke. Moreover, these prior visual aids are of no value whatsoever for tee or fairway shots.

An object of this invention is to provide an improved visual aid for assisting golfers in lining up the golf ball with the hole for putting.

Another object of the invention is to provide a golfer with a visual aid which will enable him not only to putt more accurately but to effect more accurately any golf shot, be it from the tee, fairway, or green.

Another object of this invention is to provide a visual aid for golfers which is not in any way tied to the golf club and which, therefore, will not move with the club during a golfing stroke.

A more specific object of this invention is to provide a visual aid for golfers which will assist the golfer in assuming the proper stance, as well as the proper alignment of the golf ball with the hole.

Other objects of the invention will be apparent hereinafter from the specification and from the recital of the appended claims, particularly when read in conjunction with the accompanying drawing.

Figure 1:
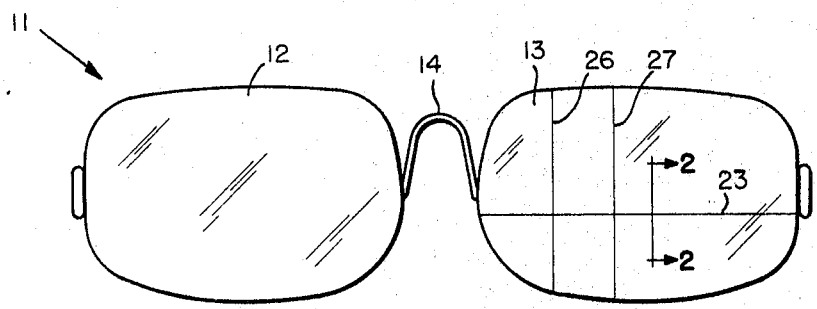
FIG. 1 is a front elevational view of a pair of spectacles incorporating a visual aid made in accordance with one embodiment of this invention.

Referring now to the drawing by numerals of reference, 11 designates generally a pair of spectacles comprising a pair of glass or plastic lenses 12 and 13, and a conventional bridge 14.

Figure 2:
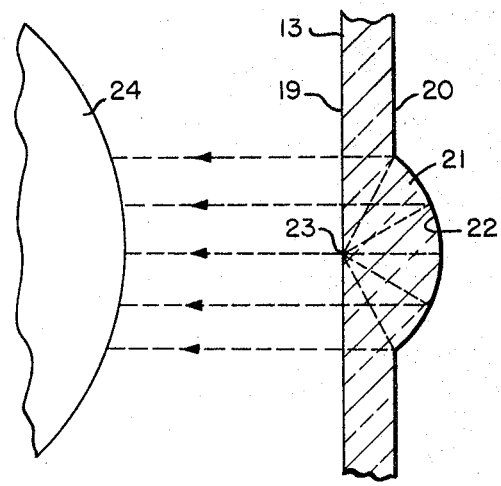
FIG. 2 is an enlarged, fragmentary sectional view taken along the line 2—2 of FIG. 1, looking in the direction of the arrows, and illustrating diagrammatically how the image is reflected to the eye of the golfer from a mirrored surface on the lens.

One of the lenses, for example the lens 13 in the case of a right-handed golfer, has on its front face 20 (FIG. 2) a very narrow, raised portion 21, which extends across the whole width of the lens, and which is convex in profile and forms a section of a cylinder. The rest of the front face 20 of the lens will be of customary curvature, ordinarily convex, while the rear face 19 of the lens will also be of customary curvature, ordinarily concave. The curvatures of surfaces 19 and 20 are ordinarily so slight that they have been shown here as plane. This cylindrical portion 21, which will be only approximately .010" in height, has its front convex surface silvered, or otherwise coated so that it will act as a mirror having a concave reflecting surface 22. Inscribed on the rear face 19 of the lens 13 directly behind the boss 21 is a straight line 23. The line 23 extends parallel to the axis of the cylindrical reflecting surface 22, and lies substantially midway between the last-named axis and the surface 22 in a radial plane through the center of surface 22, so that the latter projects, as shown by the broken lines and arrows in FIG. 2, an image of the line 23 to the eye 24 (the left eye, for example, for a right-handed golfer) of the person wearing the spectacles 11.

Figure 3:
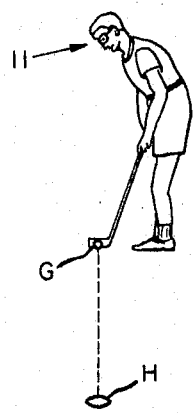
FIG. 3 illustrates a golfer utilizing the visual aid in preparation for a golf shot.

In use, for putting, the golfer positions himself or herself so that, when the golfer gazes downwardly at the golf ball G, the line 23 registers with an imaginary line, shown in broken lines in FIG. 3. This imaginary line is an extension of downwardly projected line 23, and extends from the center of the golf ball to the center of the hole H. If the golfer strokes the ball properly, then, the ball should drop into the cup.

As an assistance in driving or in making other golf shots, two further, spaced, parallel lines 26 and 27 may be scribed onto the rear face 19 of the lens 13 at right angles to the line 23. When the golfer wants to make a drive, he or she positions his or her left heel, so that an imaginary line, which passes from the center of the golf ball G to the left heel of the golfer, will register with the line 27 scribed on the lens 13. The line 26 can be aligned between the golfer's right foot and the ball, for instance, when the golfer wants to use some other club than a putter or driver, to establish the correct position of his or her right heel.

In addition to using the line 23 for lining up a putt, the golfer may place his or her putter face in registry with the line 26 or 27, and at a right angle to the line 23, to assure proper contact of the club head with the ball upon the execution of the putting stroke.

From the foregoing it will be apparent that applicant has devised a relatively simple and inexpensive device for assisting the golfer to assume the proper stance for a particular golf shot. Applicant's novel visual aid does not move with the golf club, when the latter is swung, but instead it remains stationary with the golfer's head, thus forming a more reliable and a less distracting aid than prior, golf club-mounted aids. When not in use, applicant's novel spectacle may be carried in a convenient pocket in the bag holding the golfer's clubs. Applicant's device is not limited to use in golfing, however. It may be used also for other games such as bowling, croquet, baseball, or the like. For baseball, for instance, a pitcher may use spectacles in which one or both lenses may have a square or rectangle scribed on the back or backs thereof corresponding to the "strike zone" between the knees and shoulders of the batter and the width of the plate. On the front of the lens or lenses there will be a square raised portion, each side of which like the narrow raised portion 21 is convex in profile and forms a section of a cylinder. Each convex raised portion will be silvered to provide a reflecting surface like surface 22; and each side of the square on the back of the lens or lenses will be parallel to the axis of one of the cylindrical surfaces formed on the front of the lens or lenses, so that the square on the back of the lens or lenses will project to the eye of the pitcher, and the pitcher can readily see the "strike zone" into which he should throw the ball.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A spectacle for use by an athlete for visual alignment aid comprising
  a lens,
  a cylindrical boss formed on the front face of said lens and extending transversely of said lens,
  a reflecting material on the front face of said boss to constitute a concave reflector,
  a straight line scribed on the rear face of said lens in registry with said boss and extending in the direction of the axis of said boss,
  said line being disposed at the principal focus of said concave reflector so that an infinity image of said line is presented to the adjacent eye of the person wearing said spectacle,
  said boss having a width from top to bottom less than the vertical extent of said lens so as not to impair vision through said lens.

2. A spectacle as defined in claim 1, wherein at least one further line is scribed on the rear face of said lens perpendicular to the first-named line,
  said further line being asymmetrical of said lens and disposed closer to the nasal end than to the temporal end of said lens.

References Cited

UNITED STATES PATENTS 1,985,067 10/1934 Wandersleb.
2,352,644 7/1944 Linderman et al. _____ 88—2.3
2,663,021 12/1953 Douglass.
3,264,002 8/1966 Palumbo.
3,268,228 8/1966 Novack _____ 273—32 XR JEWELL H. PEDERSEN, *Primary Examiner.*

ORVILLE B. CHEW II, *Assistant Examiner.*

U.S. Cl. X.R.
33—46; 356—138